United States Patent
Dvorak et al.

(10) Patent No.: US 12,039,806 B2
(45) Date of Patent: Jul. 16, 2024

(54) DEVICE FOR BIOMETRIC IDENTIFICATION WITH THE AID OF FINGERPRINTS AND/OR HAND CHARACTERISTICS, AND METHOD OF BIOMETRIC IDENTIFICATION WITH THE AID OF THESE CHARACTERISTICS

(71) Applicants: BRNO UNIVERSITY OF TECHNOLOGY, Bruno (CZ); TOUCHLESS BIOMETRIC SYSTEMS AG, Pfaeffikon (CH)

(72) Inventors: Michal Dvorak, Ceska Trebova (CZ); Tomas Goldmann, Frydlant nad Ostravici (CZ); Martin Drahansky, Brno (CZ); Martin Sakin, Zlin (CZ); Radim Dvorak, Adamov (CZ); Ondrej Nezhyba, Prerov (CZ); Torsten Meister, Simmerberg (DE); Alex Zarrabi, Geneva (CH)

(73) Assignees: BRNO UNIVERSITY OF TECHNOLOGY, Brno (CZ); TOUCHLESS BIOMETRIC SYSTEMS AG, Pfaeffikon (CH)

( * ) Notice: Subject to any disclaimer, the term of this patent is extended or adjusted under 35 U.S.C. 154(b) by 0 days.

(21) Appl. No.: 17/758,880

(22) PCT Filed: Jan. 6, 2021

(86) PCT No.: PCT/EP2021/050110
§ 371 (c)(1),
(2) Date: Jul. 14, 2022

(87) PCT Pub. No.: WO2021/144171
PCT Pub. Date: Jul. 22, 2021

(65) Prior Publication Data
US 2022/0415095 A1    Dec. 29, 2022

(30) Foreign Application Priority Data
Jan. 17, 2020   (DE) ................. 10 2020 200 569.9

(51) Int. Cl.
*G06V 40/40* (2022.01)
*G06V 10/141* (2022.01)
(Continued)

(52) U.S. Cl.
CPC ............ *G06V 40/45* (2022.01); *G06V 10/141* (2022.01); *G06V 40/117* (2022.01); *G06V 40/1312* (2022.01); *G06V 40/1318* (2022.01)

(58) Field of Classification Search
CPC .. G06V 40/45; G06V 10/141; G06V 40/1318; G06V 40/117; G06V 40/1312
See application file for complete search history.

(56) References Cited

U.S. PATENT DOCUMENTS 4,950,877 A * 8/1990 Kurihara ................ G06K 13/08
                                                    235/480
8,340,371 B2   12/2012 De Virel
(Continued)

FOREIGN PATENT DOCUMENTS

| CA | 2798626 A1 * | 6/2014 | ............ G06F 21/32 |
| EP | 1987472 A1 | 11/2008 | |
| WO | WO 2015/123374 A1 | 8/2015 | |

OTHER PUBLICATIONS

Germany Office Action, mailing date Jul. 17, 2020 for corresponding German Application No. DE 10 2020 200 569.9 with English translation (10 pages).
International Search Report, dated Apr. 7, 2021 for corresponding International Application No. PCT/EP2021/050110 with English translation (5 pages).
Written Opinion of the ISA, mailing date Apr. 7, 2021 for corresponding International Application No. PCT/EP2021/050110 (6 pages).

*Primary Examiner* — Lixi C Simpson
(74) *Attorney, Agent, or Firm* — Intellectual Property Law Group LLP

(57) ABSTRACT

The invention relates to a device for biometric identification with the aid of fingerprints and/or hand characteristics, the (Continued)

device comprising a sensor unit (1) directed at the region of an optical gate (2) in a scanning direction (S), wherein the optical gate (2) is adapted to initialize the sensor unit (1) for scanning an in-focus scan image or scan images of the fingers and/or hand of a person, wherein the device further comprises at least one light source (5), which is likewise directed at the region of the optical gate (2), wherein the sensor unit (1), the optical gate (2) and optionally also the light source (5) are coupled to a control and computing module (6) with software for controlling the device and its parts and for scanning a scan image or the scan images of fingers and/or a hand, and for evaluating the fingerprints and/or hand characteristics, wherein the sensor unit (1) is fixedly set to focus into a focal volume (3) which is assigned to the optical gate (2), and the sensor unit (1), the optical gate (2), the control and computing module (6) and optionally also the light source (5) are configured to scan a single in-focus scan image of the fingers and/or the hand at the time of the passage thereof through the focal volume (3).

12 Claims, 7 Drawing Sheets

(51) Int. Cl.
*G06V 40/10* (2022.01)
*G06V 40/13* (2022.01)

(56) References Cited

U.S. PATENT DOCUMENTS

| | | | |
|---|---|---|---|
| 8,971,588 B2 | 3/2015 | Abramovich et al. | |
| 2009/0245591 A1* | 10/2009 | Rowe | G06V 10/143 |
| | | | 382/115 |
| 2014/0253711 A1* | 9/2014 | Balch | G06V 40/1312 |
| | | | 348/77 |
| 2015/0098013 A1 | 4/2015 | Gray et al. | |
| 2015/0227774 A1 | 8/2015 | Balch et al. | |
| 2016/0070896 A1* | 3/2016 | Higuchi | G06F 21/32 |
| | | | 340/5.83 |
| 2017/0024603 A1* | 1/2017 | Misslin | G06V 40/1312 |

* cited by examiner

DEVICE FOR BIOMETRIC IDENTIFICATION WITH THE AID OF FINGERPRINTS AND/OR HAND CHARACTERISTICS, AND METHOD OF BIOMETRIC IDENTIFICATION WITH THE AID OF THESE CHARACTERISTICS

CROSS-REFERENCE TO RELATED APPLICATIONS

This application is a U.S. National Phase application, under 35 U.S.C. § 371, of International Application no. PCT/EP2021/050110 with an international filing date of Jan. 6, 2021, and claims benefit of German Application no. 10 2020 200 569.9 filed on Jan. 17, 2020, each of which is hereby incorporated by reference for all purposes.

FIELD OF INVENTION

The invention relates to a device for biometric identification (and/or verification) using fingerprints and/or hand characteristics, which has a sensor unit which is directed in the scanning direction into the area of an optical gate, wherein the optical gate is adapted for initializing the sensor unit for scanning a sharp scan image and the scan images of fingers and/or a hand of the person, and the device also has at least one light source, which is also directed into the area of the optical gate, wherein the sensor unit, optical gate and possibly also the light source are coupled to a control—and computing module having software for controlling the operation of the device and its parts and for scanning the scanned image or images of fingers and/or hands and evaluating fingerprints and/or hand characteristics.

The invention also relates to a method for biometric identification (and/or verification) using fingerprints and/or hand characteristics using the device, wherein the sensor unit scans a sharp scan image of the hand/palm, which is sent as scan image data to a control and computing module, in which a scan image analysis takes place. Distinctive features of the hand/palm are sought and the areas of occurrence of biometric data are detected, which are then analyzed and processed to identify fingerprints and/or palm characteristics and are then compared to a database of existing fingerprints or corresponding hand characteristics.

BACKGROUND

Biometric identification using fingerprints and/or hand characteristics is in principle a very old method that assumes a very low probability that two people will have the same fingerprints and/or hand characteristics. A number of devices and methods for performing biometric identification using fingerprints and/or hand characteristics are known, in which the biometric data are obtained either by a contact method or a contactless method.

Obtaining biometric data from fingerprints and/or hand characteristics is possible either by contact methods, i.e. the person to be identified places the finger or hand on a specific surface of a scanning device, which scans a scan image of the finger and/or hand; or a contactless method is possible, i.e. the scanning device scans the scanned image of the finger and/or hand "remotely" (from a distance), i.e. without the need for the person to come into contact with the elements of the respective scanning device. In any case, the scanned scan image is then processed for the purpose of comparing it with the scan images stored in a database of identified persons. The main disadvantage of contact methods and devices is the risk of incorrect identification (or verification) due to contamination of the contact surface of the respective scanning device. For this reason, contactless methods and devices for biometric identification using fingerprints and/or hand characteristics have recently been developed.

In the case of contactless biometric identification using fingerprints and/or hand characteristics, a number of solutions are known, which primarily solve the problem of obtaining a sufficiently high-quality, sharp and high-contrast scan image of the finger and/or hand for subsequent processing and comparison, whereby the finger and/or the hand move/moves through a scanning space of a scanning device with a certain speed.

In essence, it is possible to either use a scanner with sufficiently fast autofocus to focus on the moving hand, or one may use a scanner with a fixed depth of field and carry out the scan image recording in the area of this previously determined and set distance of the hand from the scanning device so that the scan is of sufficient quality (sharp, high-contrast, sufficient scan resolution, etc.).

A contactless biodetector is known from U.S. Pat. No. 8,340,371 (patent family with EP 1 987 472) which, for the correct positioning of the hand or finger of the person to be identified to the area of the depth of field of the scanning device, here in the target height F above the scanning device, exploits the fact that at least two scanned images are projected onto the side of the user's hand or finger that is remote from the side to be scanned, which only by merging on the surface of the hand or finger at a correct (nominal) height F above the scanning device form a defined scan image that is visible and perceptible by the user, so the user himself may perform the setting of the hand or finger in the required target position relative to the scanning device. The disadvantage of this solution consists in particular in the fact that the user has to stop at the biodetector and place his hand or finger in the desired position, but this does not require the presence of the operator. However, this takes a certain amount of time, during which the biodetector is blocked, which leads to a reduction of the passage of people through the identification system, or it increases the time required to perform biometric identification.

From US 2015/0227774 a contactless "on-the-go" scanner for fingerprints is known, which is able to scan the fingerprints on the moving hand of a person and to perform an identification of the respective person during its movement around the scanner or while moving the hand through a defined scanning area in front of the scanning device. At the same time, an optical gate in the form of a beam interruption sensor is placed in the scanning area, where the beam interruption sensor detects a point in time when the hand to be scanned passes the scanning area, whereby the hand to be scanned interrupts the light beam passing transversely to the scanning area and sent by an emitter of the light beam into a detector of the light beam on the other side of the scanning area. At this time, the scanning device is put into operation, which is configured to take the scanned image of the scanning area and which has some cameras. As soon as the sensor detects a beam interruption, i.e. as soon as the object (hand) has passed the scanning area, the camera for the hand, i.e. the camera for hand scanning, in cooperation with the connected computer, detects whether the object in the scanning area is a human hand, and also detects the placement of fingers on said hand. In the scanning area, at least one camera for fingers, i.e. a camera for fingerprint scanning, then scans the high resolution scan image of at least part of any of the detected fingers of the hand passing the scanning area. According to the description of US 2015/0227774, the camera for fingers must have a sufficiently high scanning frequency, i.e. it must be able to scan a sufficiently large number of individual scan images per second, which essentially has to match the assumed speed of the movement of the hand to be scanned through the scan area. The scanning frequency in this solution is essentially 24 scans/second and higher, with 125 scans/s, 150 scans/s and even 240 scans/s also being mentioned here. The camera for fingers must then have a correspondingly short exposure time. As soon as the hand camera recognizes that there really is a hand in the scanning space, the finger camera is activated even earlier than the fingers pass the range of sharpness of the finger camera. The camera for fingers, which has set a specific scan frequency, scans several finger scan images starting at this point in time. The camera for fingers thus scans a large number of scan images of individual fingers, with the evaluation algorithm in the connected computer identifying which scan image is the sharpest for each finger. Thus, a large number of scan images with high resolution are already being processed in this phase. The fingerprints of individual fingers are then determined from the identified scan images with the best focus and they are compared with a database of fingerprints for identity determination. The disadvantage of this solution is the need for scanning, processing and evaluation of a large number of high-resolution scan images for personal identification.

An agile contactless biometric sensor device is known from US 2014/0253711, which has a sensor that tracks a field of view and also has a scanning image system that scans one or more pieces of biometric information in the field of view. The device also has a tiltable adjustment device that adjusts and orients the scanning image system to the position of the object detected in the field of view by the sensor. The disadvantage of this arrangement is the need for complicated positioning of the scanning imaging system in such a position of the field of view in which the palm of the person has been previously detected and identified for biometric identification.

The disadvantage of the prior art in the field of contactless scanning of fingerprints and/or hand characteristics consists in particular in a mutual coordination of the scanning system with the system of detection of hand and individual fingers, which either requires a complicated autofocus system with a complicated control system, or requires a complicated positioning system of the scanning system with the identification of the hand placed in the scanning space, or requires scanning, processing and evaluating a large number of scanned images of the hand and fingers with a high resolution, which is time-consuming and expensive, especially in terms of the computing power of the connected computers, which in turn has an impact on the price of such devices.

SUMMARY OF INVENTION

The object of the invention is to provide an improved device and an improved method for biometric identification (and/or verification) using fingerprints and/or hand characteristics.

The object is achieved according to the invention by a device and by a method according to one or more of the claims.

Advantageous configurations of the invention are the subject matter of the dependent claims.

The object of the invention is achieved by a device of the generic type for biometric identification (and/or verification) using fingerprints and/or hand characteristics, the essence of which is that the sensor unit is fixedly focused on a focal space associated with an optical gate, and the sensor unit, the optical gate, the control and computing module and optionally also the light source are configured to scan a single sharp scan image of the fingers and/or the hand at the moment of their passage through the focus space.

The object of the invention with regard to the method for biometric identification using fingers and/or hand characteristics is achieved in that only a single sharp scan image of the hand is scanned and processed for biometric identification using fingers and/or hand characteristics.

The solution according to the invention eliminates or minimizes disadvantages of the prior art. In particular, the scanning system is coordinated with the system of hand and individual finger detection and demands on the computing power of the connected computer are reduced without negatively affecting reliable and fast biometric identification.

In particular, the solution according to the invention may be designed in such a way that the user does not have to guide his hand through a relatively narrow slot in which the biometric identification of the hand takes place. Instead, the device according to the invention may be designed in such a way that the user presents his hand for biometric identification in a largely open space in the area of the device, for example by aligning the palm of the hand vertically.

In one embodiment, the optical gate comprises an IR or "near IR" or visible laser or LED radiation source directed transversely to the scanning direction of the sensor unit onto a photodiode arranged on an opposite side of the optical gate.

In one embodiment, the optical gate has a proximity sensor.

The advantage of the invention is also that it allows for a constructively flexible solution, particularly when using a proximity sensor, thanks to which the requirement for coupling two fixed construction points in the scan zone is eliminated. In contrast to the existing devices, which use high-speed cameras and high resolution of a large number of scanned scan images, which they then reconstruct, the presently disclosed device uses a non re-sharpened narrow focus band in combination with precise palm location determination to obtain a single scan image which is then processed relatively easily. The solution disclosed here represents in particular an optimization of the device and the entire process of contactless biometric and/or dactyloscopic identification (and/or verification).

In one embodiment, the optical gate comprises a 3D camera adapted to detect the speed of hand movement in the scanned area relative to the focus space and to determine the hand position in the scanned area relative to the focus space by an active triangulation method.

In one embodiment, the light source is a light source in the "green" part of the spectrum.

In one embodiment, in addition to the light source, at least one NIR radiation source with a wavelength of 760 to 840 nm is directed into the focus space, which is able to penetrate melanin and which at the same time is absorbed by hemoglobin to detect the liveness of the hand during biometric identification.

In one embodiment, an auxiliary scanning camera is directed into the focus space, which is sensitive in the NIR or IR radiation range and is adapted to scan a scan image or a scan image sequence to detect the liveliness of the hand in the focus space.

In one embodiment, at least one light source of visible radiation, at least one UV radiation source and at least one IR radiation source (IR) or a "near IR" radiation source is directed into the focus space for simultaneous biometric identification using the fingerprints and/or hand characteristics and determination of the liveliness of the hand in the focus space.

In one embodiment, at least one heat-sensitive sensor (bolometer) for detecting the liveliness of the hand during the biometric identification is directed into the focus space.

In one embodiment, the sensor unit has a maximized aperture number in relation to the illumination of the focus space and the diffraction limit, with the target focus space relative to the sensor unit starting at the position (distance of the optical gate to the sensor unit) of the optical gate that is shifted towards the sensor unit in the scanning direction to by the value σ, with the target focus space ending with respect to the sensor unit in the position of the optical gate which is shifted in the scanning direction towards the sensor unit by the value $D_{0f}$. The value σ is an empirically determined (considered) delay between the beginning of the presence of the hand and the beginning of the scanning by the sensor unit (or a displacement of the hand to be expected during this empirically determined delay).

The value $D_{0f}$ is a width of the area in which detection occurs, or the difference between the greatest distance in the in-focus range and the shortest distance to the in-focus range of the sensor unit.

In one embodiment, the device is cranked, the device having a vertical stand which is open on its upper side and in which a sensor unit with its optics is arranged in the upward direction, wherein in the vertical stand a control and computing module, a power source or power adapter and other electronics are also mounted, wherein on the open upper side of the vertical stand a reflection unit with an inclined reflection surface and an entrance window for the entry of the scanned image of the hand to be scanned into the reflection surface and via the inclined reflection surface also into the sensor unit is mounted, wherein an additional camera for scanning the depth and/or a discontinuous movement and an auxiliary scanning camera for detecting the liveliness are mounted in the reflection unit, with a control and guidance display also being arranged on the reflection unit.

A mathematical model enables selection of such a scanning and optical system, which within the limits of the depth of focus is able to scan data useful for dactyloscopic purposes in one go. In contrast to the prior art, where one works with high resolution and a high-speed camera and the scanned data is then reconstructed in a complicated and computationally complex manner, in the solution disclosed here only a single scan image is scanned, the processing of which only takes a fraction of that of the computing power required by the devices known in the art. With regard to an effective camera system, cheap, small and energy-efficient computing technology is then sufficient for scanning image processing and controlling individual peripherals. Thanks to this, the requirements for cooling and installation space of the whole device are reduced, which is characterized by smaller dimensions of the whole device and its very low noise level. Another advantage of the presently disclosed solution consists in bringing the light source closer to the scanning area, in particular in the incorporation of light sources in a guide plate and/or side wall, thanks to which the reduction of the demands on the total light output of the lighting system is achieved; and at the same time, thanks to a non-direct lighting angle, greater user comfort is achieved. The improvement in lighting in the presently disclosed solution is further enhanced by the modular character of the lighting, which opens the possibilities of simple scalability, flexibility in arrangement and possibilities of combinations of light sources with suitable spectral properties within individual modules for the required purposes.

BRIEF DESCRIPTION OF THE DRAWINGS

Exemplary embodiments of the invention are explained in more detail below with reference to drawings.

Corresponding parts are given the same reference numerals throughout the drawings.

DETAILED DESCRIPTION OF SPECIFIC EMBODIMENTS

Exemplary embodiments of the device for biometric identification using fingerprints and/or hand characteristics and of a method using the device are described below.

Figure 1:
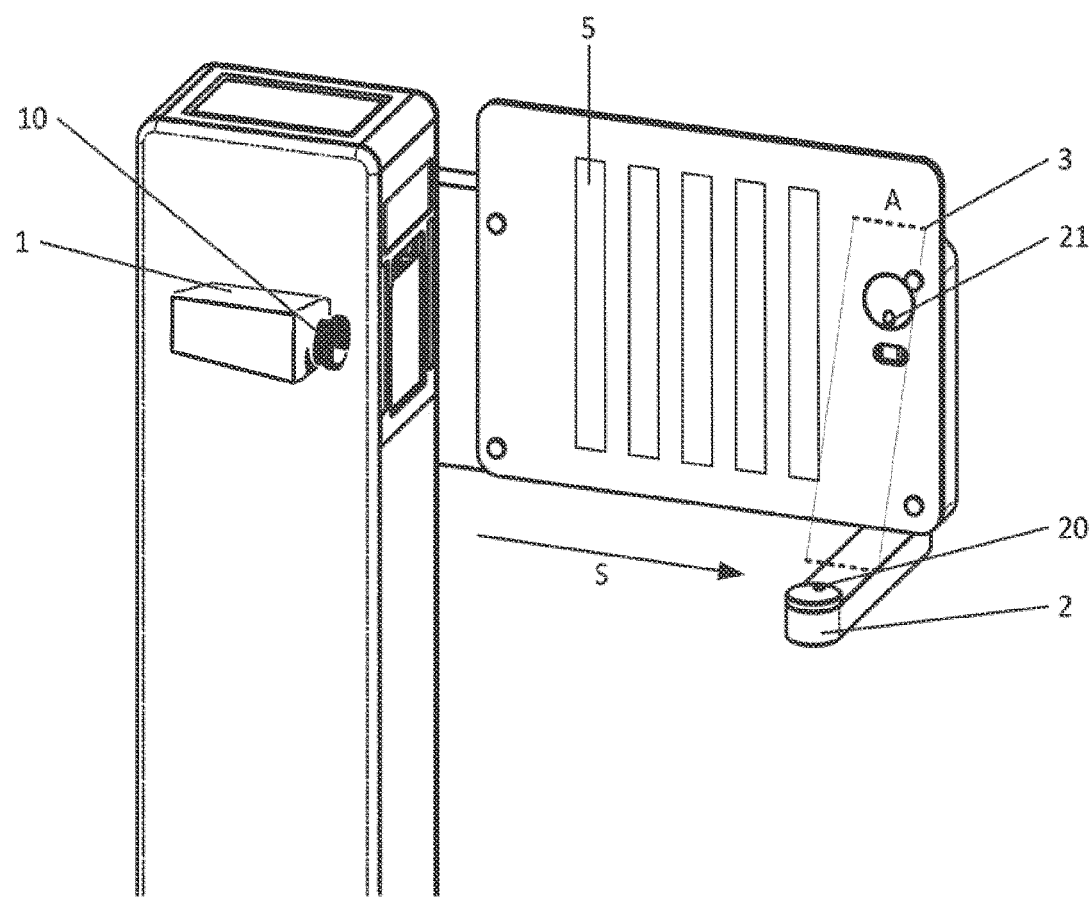
FIG. 1 is a schematic view of a device for biometric identification (and/or verification) using fingerprints and/or hand characteristics with an optical barrier.

FIG. 1 is a schematic view of a device for biometric identification (and/or verification) using fingerprints and/or hand characteristics with an optical gate 2 forming a switching device in the form of an optical barrier.

The device for biometric identification (and/or verification) using fingerprints and/or hand characteristics has a sensor unit 1 which, for example, is a monochromatic camera with a resolution of a CCD or CMOS scan chip in the range of 10 MP to 25 MP, preferably with a resolution of the CCD or CMOS scan chip from 12 MP to 20 MP. The value of the resolution of the CCD or CMOS scan chip of the sensor unit 1 influences the size of the area to be scanned, so it influences the size of the area in space in which the hand to be scanned may be located, so that contactless scanning of the scan image of the hand with fingers reliably occurs. A surface resolution of the sensor unit 1 is, for example, in the range from 400 to 1000 DPI, preferably 500 DPI. In the specific case of the exemplary embodiment, a camera is used as sensor unit 1 (e.g. Basler ace acA4024-29 um, Basler ace acA5472-17 um, another camera without an IR filter or another camera without an IR filter and with a higher sensitivity of the scan image recording in the IR range). In another exemplary embodiment, which is not shown, the sensor unit 1 is designed as a color camera with suitable optical properties and light properties for scanning a scan image.

The sensor unit 1 may be directed with its CCD or CMOS scan chip in a scanning direction S toward an optical gate 2 and toward a focus space 3 of the sensor unit 1, the optical gate 2 being adapted to initialize the sensor unit 1 for scanning a sharp scan image, in particular a single sharp scan image, of the object, which is located in the focus space 3 of the sensor unit 1. The focus space 3 of the sensor unit 1 is a three-dimensional space in front of the sensor unit 1, on which the sensor unit 1 is fixedly focused, and in which the sensor unit 1 always scans a sharp scan image of the object that is located somewhere in the focus space 3. In particular, the sensor unit 1 may have suitable optics 10, which are adapted for focusing the sensor unit 1, in particular for fixedly focusing the sensor unit 1, into the focus space 3.

In the exemplary embodiment from FIG. 1, the optical gate 2 has a radiation source 20, in particular an IR or "near IR" radiation source or a laser or LED radiation source 20 radiating in a visible range of the spectrum, which, for example, transversely to the scanning direction S of the sensor unit 1, is directed to a photodiode 21, which is placed on an opposite side of the optical gate 2. The optical gate 2 may include operational amplifiers, not shown, which amplify and monitor the voltage across the photodiode 21 on which the laser and/or LED beam is incident, and by momentarily interrupting this laser and/or LED beam the hand to be scanned occludes the photodiode 21 of the optical gate 2 and the voltage drop across it changes, for example on the basis of a switching transistor (not shown), which then leads to the initialization of the sensor unit 1 and the scanning of one or more sharp scan images, in particular a single sharp scan image, of the focus area 3 with the hand to be scanned.

Figure 2:
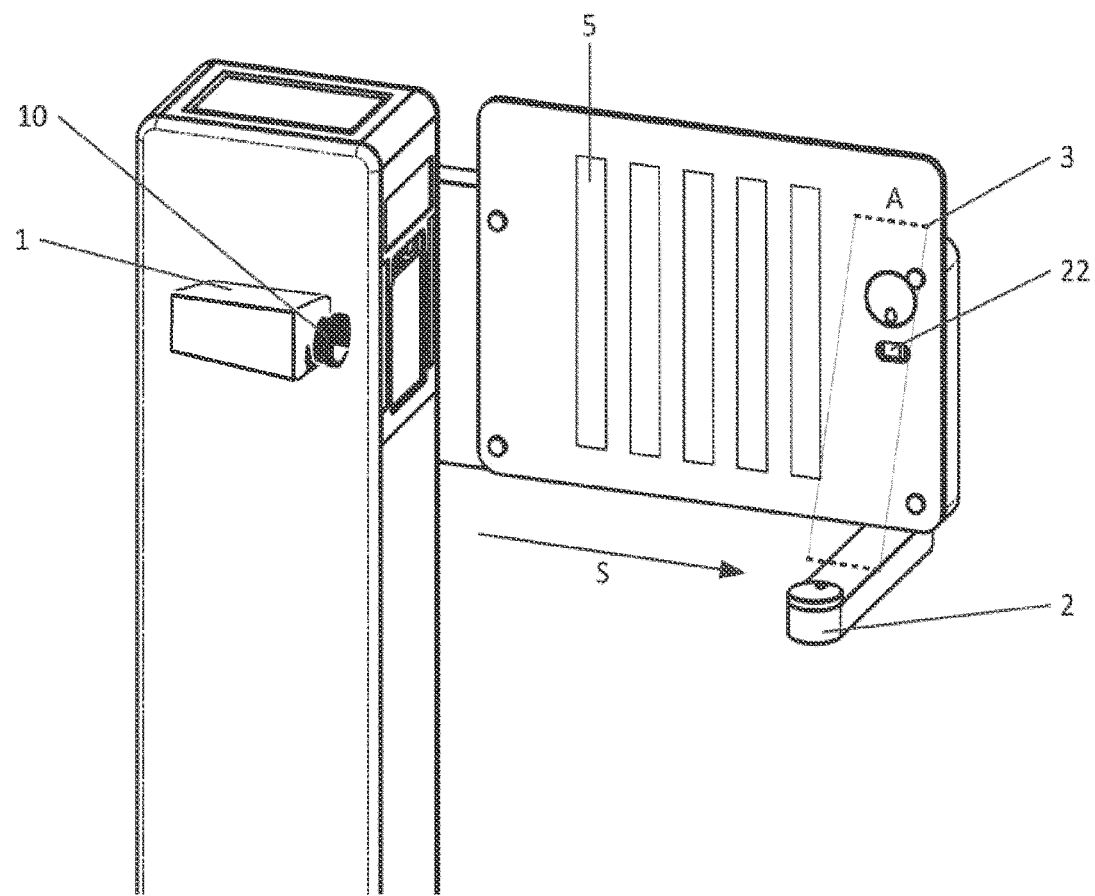
FIG. 2 is a schematic view of a device for biometric identification (and/or verification) using fingerprints and/or hand characteristics with a proximity sensor.

FIG. 2 is a schematic view of an embodiment of the device for biometric identification (and/or verification) using fingerprints and/or hand characteristics with a proximity sensor 22.

In the exemplary embodiment from FIG. 2, the optical gate 2 has a proximity sensor 22, in particular a so-called proximity sensor, which, in contrast to the IR or "near IR" or visible laser and/or LED beam from FIG. 1 does not require interruption of the IR laser beam by the hand passage between the laser and/or LED source 20 and the photodiode 21 and therefore does not require any special design of the body of the optical gate 2 either. The proximity sensor 22 has one to three sources of modulated light radiation, not shown here, which are directed into the area of an expected appearance of the hand in relation to the focus space 3 and which emit one to three modulated light beams, the proximity sensor 22 also having a detector for a reflection of the modulated light beams from a hand or palm that approaches or is in the focus space 3. Electronics (not shown) of the proximity sensor 22 are used to determine the appearance of the hand in the focus area 3, which, for example, uses a method of trilateration (time of flight) based on the modulated light beams from the named sources of the modulated radiation and based on the reflection of these modulated light beams by the hand in the space of the expected appearance of the hand, after which a point in time may be determined by extrapolation at which the hand is actually in the scanning position in the focus space 3. At this point in time, the sensor unit 1 is initialized and a sharp scan image, in particular a single sharp scan image, of the focus area 3 with the hand to be scanned is scanned.

In an exemplary embodiment that is not shown, the optical gate 2 may be replaced or supplemented by a 3D camera adapted to detect the speed of the hand movement in the area to be scanned and to determine the hand position in the area to be scanned using an active triangulation method. Alternatively or additionally, the scanned room data may be used for additional biometric identification (and/or verification) based on the 2D and/or 3D hand geometry.

In an exemplary embodiment that is not shown, the optical gate 2 has a combination of a light barrier as in FIG. 1 (with a radiation source 20, which is directed transversely to the scanning direction S of the sensor unit 1 toward the photodiode 21, which is mounted on an opposite side of the optical gate 2) and a proximity sensor 22 as in FIG. 2, whereby this combination is supplemented by a 3D camera according to the further embodiment not shown, which is adapted to detect the speed of the hand movement in the area to be scanned in relation to the focus space 3 and to determine the hand position in the area to be scanned relative to the focus space 3 with the method of active triangulation.

At least one light source 5 may also be directed into the focus space 3, which light source is adapted to illuminate the hand in the focus space 3 for scanning a high-quality, sharp scan image of the hand by the sensor unit 1. The light source 5 is designed, for example, to emit the light in the "green" range of the spectrum, preferably with a dominant wavelength of 520 to 530 nm.

In order to facilitate to also detect a liveliness of the hand during the detection of biometric and/or dactyloscopic data, in an exemplary embodiment that is not shown, at least one, but preferably more than one, NIR radiation source with a wavelength from 760 to 840 nm, capable of penetrating melanin and being absorbed by haemoglobin, may be directed into the focus space 3. Since the CMOS and CCD standard scan chips are also sensitive in the range of NIR and IR radiation, it is possible to use the same device, the same method and the same scan image of the hand to detect a bloodstream in a hand, i.e. for the liveliness detection, which was scanned with a simultaneously activated light source 5 and NIR radiation source, both for dactyloscopic analysis and for detection of the liveliness of the hand to be scanned and/or the fingers to be scanned. This may advantageously be used in the evaluation, on the one hand, for detecting counterfeits of the hand and/or the fingers and, on the other hand, for biometric identification based on the shape of the bloodstream of the hand to be scanned. To improve the detection of the liveliness of the hand, an auxiliary scanning camera may be directed into the focus space 3 in an embodiment that is not shown, which is sensitive in the NIR or IR radiation range and is able to scan not only individual scan images, but also sequences of scan images to scan for better detection of the liveliness of the hand.

In a further exemplary embodiment, which is not shown, at least one light source 5 of visible radiation, and at least one UV radiation source (UV) and at least one IR or "near IR" radiation source (IR) are directed into the focus space 3 at the same time, wherein a single scanned image of the hand scanned by the sensor unit 1 or a single scanned image of the hand scanned by the sensor unit 1 and a sequence of scanned images scanned with an auxiliary scanning camera are evaluated from the point of view of the absorption properties of the material to be scanned for all types of radiation used with different wavelengths, from which is then determined whether it is the skin of a living user or not.

In a further exemplary embodiment, which is not shown, at least one bolometric sensor (i.e. a heat-sensitive sensor which, e.g. having an array of bolometers) which enables the acquisition of a baseline thermal scan image of the hand with a thermal distribution of the palm surface is directed into the focus space 3 at the same time.

Due to the heat distribution, the liveness of the presented hand may be detected.

A reliable scanning of a high-quality sharp scan image, in particular a single high-quality sharp scan image, of the hand by the device disclosed here and the method disclosed here is given by the fact that a narrow band of the depth of focus of the sensor unit 1, i.e. small depth A of the focus space 3, in combination with precise determination of the position of the hand, is used to obtain a high-quality sharp scan image, which is intended for subsequent processing. The scanning position, i.e. the position of the focus space 3 in the scanning direction S in relation to the sensor unit 1, and the scanning time of the hand by the sensor unit 1 are given by a large number of parameters of the sensor unit 1 and the illumination system of the hand, i.e. at least one light source 5. The scanning time of the hand by the sensor unit 1 represents the smallest possible (minimum) time interval during which the forward movement of the hand through the focus space 3, even despite a non-negligible speed of this movement, does not cause any distortion of the scan image of the hand scanned by the sensor unit 1 from front, and during which the perpendicular (transverse) movement of the hand is at the same time negligible.

With regard to the changing position of the hand during its scanning when moving through the focus space 3, it is therefore necessary to maximize the depth A of the focus space 3 in which the sensor unit 1 operates (scans) with maximum focus. This maximization of the depth A of the focus space 3 is achieved by maximizing a aperture number of the sensor unit 1 in combination with the pixel size of the CCD or CMOS scan chip and in a combination with an increase in the scan width, i.e. a width between the sensor unit 1 and the focus space 3. A maximization of the aperture number of the sensor unit 1 is achieved for example by reducing the diameter of an entrance lens, not shown, of the sensor unit 1 using an aperture.

In view of the fact that the requirements for the pixel size of the CCD or CMOS scan chip and the increase in the scan width are usually limited by the requirements for the practical design and price of the resulting device, one of the most effective ways is precisely to maximize the aperture number of the sensor unit 1, which is essentially limited by the lighting requirements of the focus area 3 and the diffraction limit.

In an exemplary embodiment of the device, the scan width is 1 m, the sensor unit 1 has the pixel size of the CMOS scan chip 1.85 μm×1.85 um, aperture f/5.6, shutter speed 546 μs, the light source 5 has a luminous flux of 9120 lm of diffuse light with a suitable wavelength and a depth of focus of ~4 cm (i.e. dimension A of the focus space 3) is obtained.

The scanning position of the hand is therefore given by the focus space 3, which may be determined as follows: The target focus space 3 in relation to the sensor unit 1 begins in a position $P_m$ (distance of the optical gate 2 to the sensor unit 1) of the optical gate 2, which is shifted in the scanning direction S towards the sensor unit 1 by the value σ, i.e. $P_m+σ$, where σ is an empirically determined (considered) delay between the hand presence and the start of scanning by the sensor unit 1 (or a displacement of the hand to be expected during this empirically determined delay). At the same time, it is true that the target focus space ends in the position $P_m$ of the optical gate 2 relative to the sensor unit 1, which is shifted in the scanning direction S towards the sensor unit 1 by the value $D_{of}$, i.e. $P_m+D_{of}$, where:

$$D_{of}=D_f-D_n,$$

where $$D_n = \frac{s(H-f)}{H+s-2f}$$

$$D_f = \frac{s(H-f)}{H-s}$$

$$H = \frac{f^2}{Nc} + f$$

with:
H—hyperfocal width [mm],
f—focal width of the lens [mm],
s—distance between the sensor unit 1 and the object to be scanned (hand),
$D_n$—shortest distance to the focus area,
$D_f$—largest width in the focus area,
N—aperture number (fl diameter of the entrance aperture),
c—diameter of the circle of confusion (CoC) which is proportional to the pixel size of the chosen CCD or CMOS scan chip.

Optimizing the arrangement of the device and the process based on said mathematical model makes it possible to choose a sensor unit 1 and arrangement of the device that is capable of collecting useful biometric and/or dactyloscopic data within the limits of the depth of field once, i.e. in the form of a single scan image without computationally expensive and time-consuming reconstructions of the scanned data after the end of the scanning, as is the case in the prior art.

The device also has a control and computing module 6 for scan image processing and control of individual peripherals, which is here, for example, a computer of the miniPC category, e.g. a computer UP Squared, thanks to which very low requirements or cooling and space are achieved, which allows to design the resulting device very small, with a low nominal electric power consumption and with a minimal acoustic impact on the environment.

Figure 5:
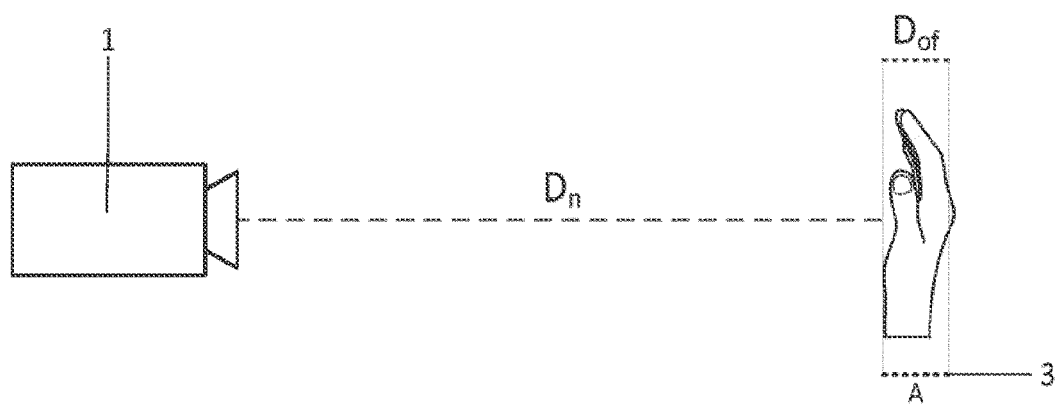
FIG. 5 is a schematic view of a line arrangement of a device for biometric identification (and/or verification) using fingerprints and/or hand characteristics, FIG. 6 a schematic view of a possible specific implementation of a device for biometric identification (and/or verification) using fingerprints and/or hand characteristics, and FIG. 7 a schematic view of an exemplary embodiment of a device for biometric identification (and/or verification) using fingerprints and/or hand characteristics with compensation for delay of a camera system.

FIG. 5 is a schematic view of an embodiment of the device for biometric identification (and/or verification) using fingerprints and/or hand characteristics in a linear arrangement.

From the point of view of the actual implementation of this presently disclosed device, a schematic of a line arrangement of the device is shown in FIG. 5, wherein the individual components oft he device are arranged consecutively in a line, which results in the formation of a device with a certain overall length but with a low height and small depth with regard to the required distance of the beginning and end $D_n$, $D_f$ of the focus space 3 from the sensor unit 1.

Figure 3:
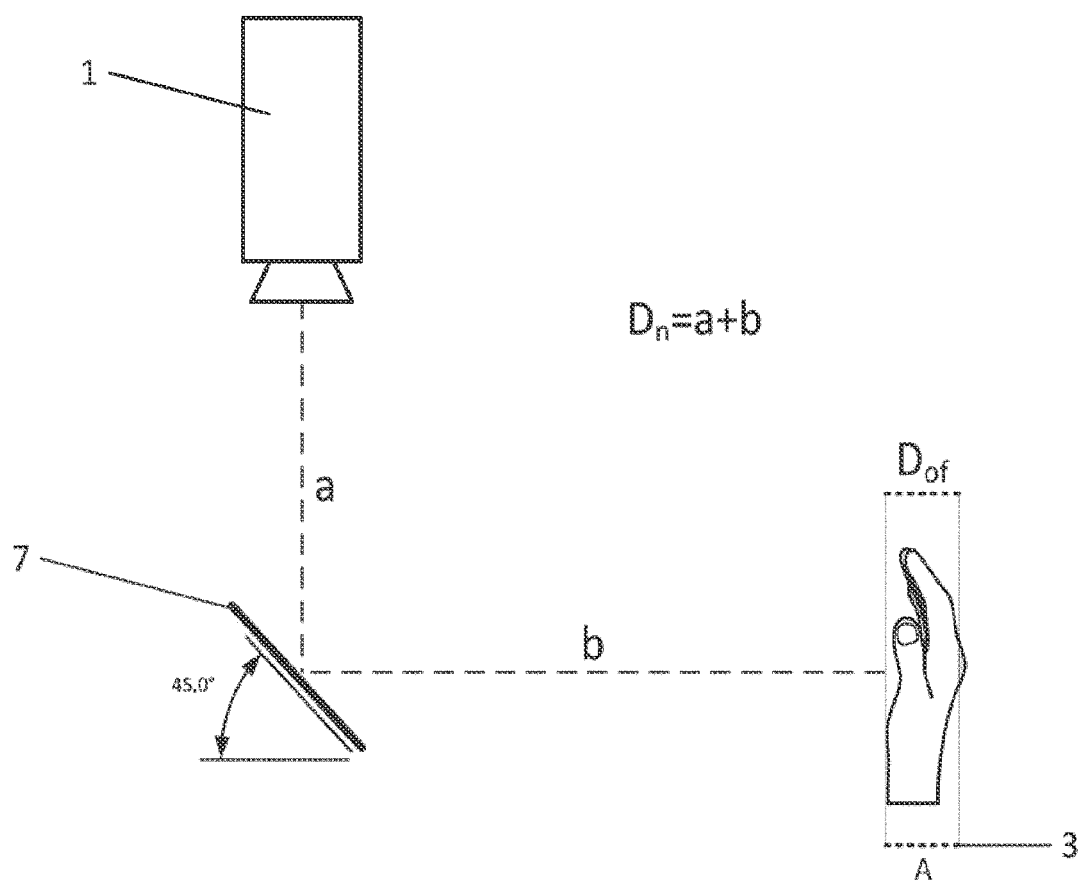
FIG. 3 is a schematic view of a cranked arrangement of a device for biometric identification (and/or verification) using fingerprints and/or hand characteristics.
Figure 4:
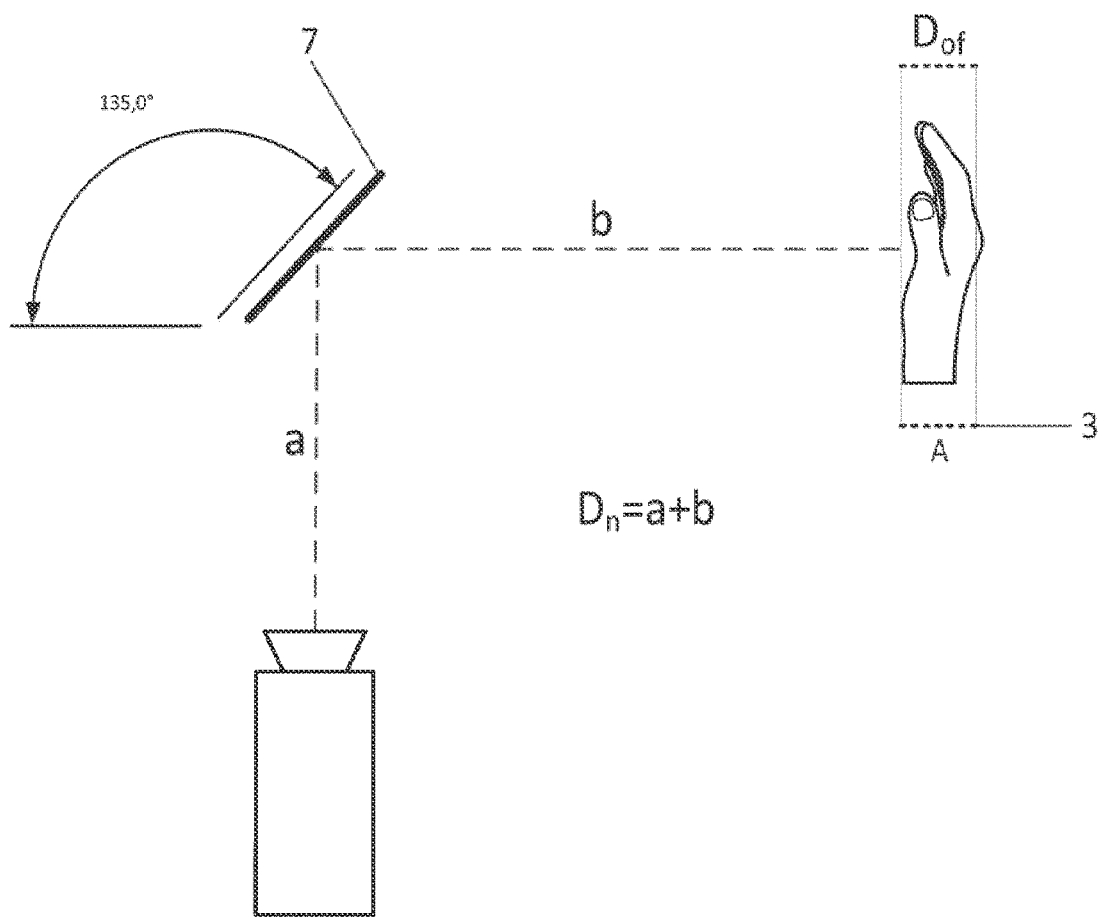
FIG. 4 is a schematic view of another example of a cranked arrangement of a device for biometric identification (and/or verification) using fingerprints and/or hand characteristics.

FIGS. 3 and 4 are schematic views of embodiments of the device for biometric identification (and/or verification) using fingerprints and/or hand characteristics in a cranked configuration.

If the device cannot be used in the linear arrangement as in FIG. 5, e.g. for reasons of space at the installation site, there is the possibility of inserting a suitably tilted reflection surface 7 between the sensor unit 1 and the focusing space 3, which, while maintaining the target width of the beginning and end $D_n$, $D_f$ of the focus space 3 results in the formation of a "cranked device" with the same total length of individual branches a, b of the distance of the beginning and end $D_n$, $D_f$ of the focus space 3 from the sensor unit 1. Such a cranked device is for example shown in FIGS. 3 and 4, where the device has a substantially smaller overall length than in the embodiment according to FIG. 5 while maintaining the same distance of the beginning and end $D_n$, $D_f$ of the focus space 3 from the sensor unit 1. In contrast to this, however, such a cranked device has a greater height and/or width, depending on the plane or planes in which the scanning direction S is cranked. In an exemplary embodiment that is not shown, the scanning direction S is cranked more than once other than in FIGS. 3 and 4, allowing fort he formation of an even more compact device, but increasing the requirements to the quality and precision of the of the reflection surfaces 7, due to the elimination of deformations of the reflected scan image of the hand and due to the elimination of the lowering of the light properties of the scan image to be scanned.

Figure 6:
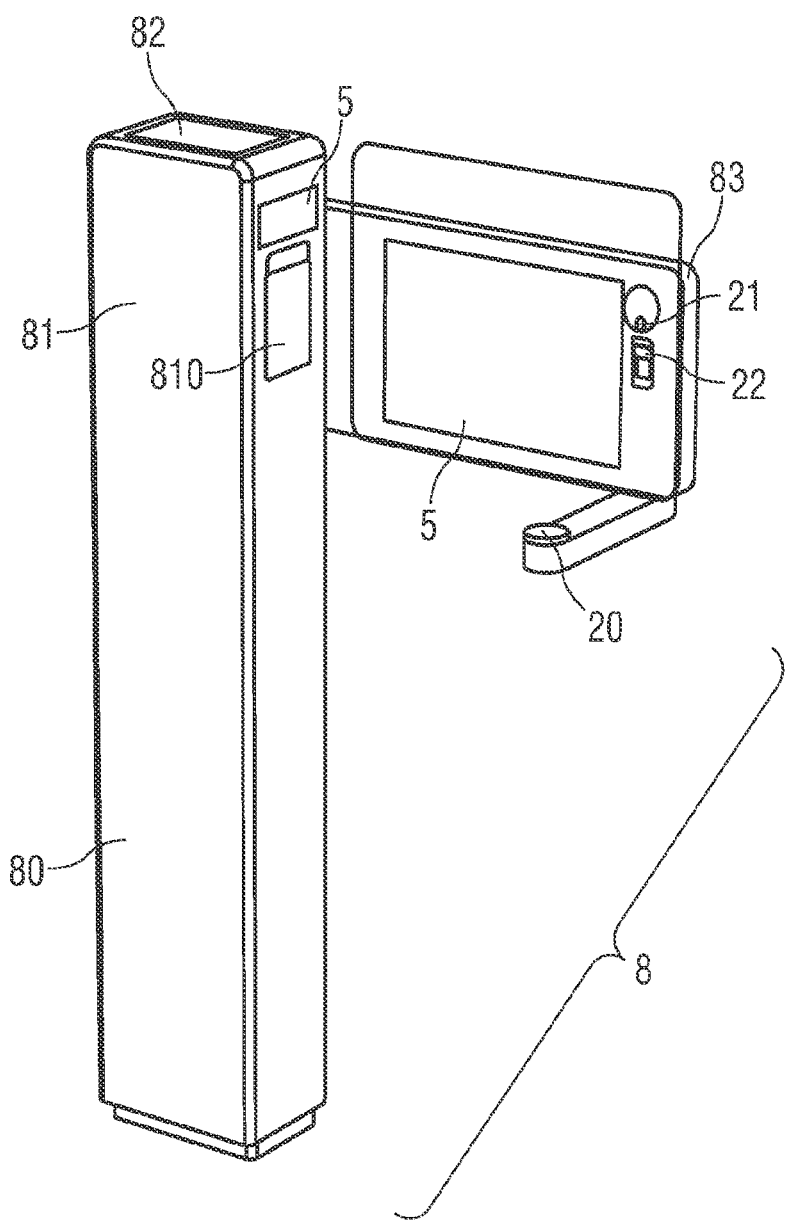

FIG. 6 is a schematic view of a possible specific implementation of a device for biometric identification (and/or verification) using fingerprints and/or hand characteristics.

In the embodiment of FIG. 6, the device is cranked as shown in FIG. 4. This device 8 has a vertical stand 80 which is open on its upper side and in which a sensor unit 1 with its optics 10 is arranged in the upward direction. Furthermore, a control and computing module 6, a power source or a power adapter and other electronics may be arranged in the vertical stand 80. In an open upper side of the vertical stand 80, a reflecting unit 81 having a slanted reflecting surface 7 and an entrance window 810 adapted for entry of the scan image of the hand to be scanned from the reflecting unit 81 and further via the slanted reflecting surface 7 into the sensor unit 1 is arranged. Optionally, an additional camera for scanning the depth and/or a discontinuous movement and possibly also an auxiliary scanning camera for detecting the liveliness based on the absorption properties of the material to be scanned for different types of radiation with different wavelengths (visible, UV and IR) and/or a bolometric sensor are arranged in the reflection unit 81. A display 82, for example a touch display, may be arranged on the reflection unit 81, which on the one hand may be adapted for primary user registration, and also for informing the user, e.g. about the course of personal identification, showing an animation visualizing the reason for a scanning failure (e.g. incorrect position of the hand), and also for operating personnel and a setting of the device, etc.

In the exemplary embodiment shown, a guide plate 83 is mounted on one side of the vertical stand 80 and/or the reflection unit 81, which is adapted to guide the person to be identified to move their hand in a respective plane, speed, etc. in relation to the entry window 810 of the reflection unit 81. In an embodiment that is not shown, the guide plate 83 is replaced by a display 82 with a guide animation that illustrates an operating manual for the device disclosed herein. The display 82 is placed at a suitable location on the device 8. The guide plate 83 may be placed either in the position shown, possibly in the upper part (lighting down) or in the lower part (lighting up).

The respective device may be operated with a method in which the sensor unit 1 is in a standby mode and expects a signal from the optical gate 2 about the appearance of a hand in the area of the optical gate 2. As soon as the hand appears in the area of the optical gate 2, this emits the said signal, which is the impulse for initiating the scanning of a sharp scan image, in particular a single sharp scan image, of the hand in the focus space 3 by the sensor unit 1. This scanned, sharp scan image is sent as scan image data to the control and computing module 6, e.g. formed by a miniPC The control and computing module 6 performs a scan image analysis of this, in particular single, scan image, searches for contours of the hand and fingers and detects the areas where biometric and/or dactyloscopic data occur for biometric identification (and/or also verification). The areas of occurrence of biometric and/or dactyloscopic data are then subsequently further analyzed and processed for identification and/or verification of fingerprints or hand characteristics, which are then compared to a database of stored fingerprints or hand characteristics. Thereafter, based on a match or non-match found, a decision is made on positive or negative biometric verification of the individual, or the identified identity of the individual is communicated.

Figure 7:
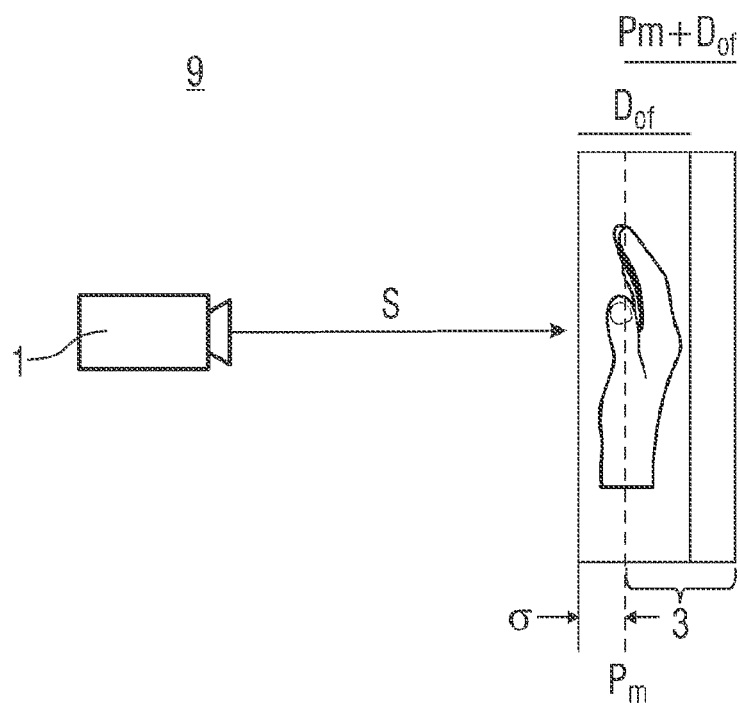

FIG. 7 shows a schematic view of a further exemplary embodiment of a device 9 with a sensor unit 1 for biometric identification (and/or verification) using fingerprints and/or hand characteristics with compensation for a delay σ of a camera system.

The scanning position of the hand is given by the focus space 3 or detection space. The target focus space begins in a position $P_m - \sigma$ (distance of the optical gate 2 to the sensor unit 1, taking account of a delay σ of the sensor unit 1) and ends in a position $P_m + D_{of}$. The target field of focus is thus determined by a distance between the position $P_m - \sigma$ and the position $P_m + D_{of}$.

The position $P_m$ represents the distance from the sensor unit 1 to the optical gate 2.

Reference σ represents an empirically observed delay σ of the sensor unit 1 or of a camera system when the hand is detected when it enters the focus space 3, which is or should be compensated (delay σ between the hand presence and the start of scanning by the sensor unit 1, in order to take account of a displacement of the hand to be expected during this empirically determined delay σ when determining the correct spacing or the correct distance).

When a hand enters focus area 3, a trigger occurs upon the first entry of the hand, specifically a finger or thumb of the hand.

Herein, in order to take account of the delay σ of the sensor unit 1, the position $P_m$ is shifted as the correct distance or as the correct spacing from the sensor unit 1 to the optical gate 2 by the delay σ of the sensor unit 1 according to the relation: $P_m - \sigma$, and this value is considered as the correct distance or correct spacing.

REFERENCES 1 sensor unit
2 optical gate
3 focus space
5 light source
7 reflection surface
8 device
9 device
10 optics
20 radiation source
21 photodiode
22 proximity sensor
80 stand
81 reflection unit
82 display
83 guiding plate
810 entry window
a branch
b branch
A depth, dimension of the focus space
$D_n$ shortest width to the focus space $D_{of}$ value
$P_m$, $P_m+D_{of}$, $P_m-\sigma$ position
S scanning direction
σ delay of the sensor unit

The invention claimed is:

1. A device for biometric identification using at least one of fingerprints and hand characteristics, the device having a sensor unit which is directed in a scanning direction into the area of an optical gate, the optical gate adapted for initializing the sensor unit for scanning a sharp scan image of at least one of a person's fingers and hand, the device further comprising at least one light source of a visible radiation also directed into the area of the optical gate, wherein the sensor unit and the optical gate are coupled with a control and computing module having software for controlling the device and its parts and for scanning an image of the at least one of the fingers and the hand and for evaluating the at least one of the fingerprints and hand characteristics, wherein the sensor unit is focused fixedly on a focus space that is assigned to the optical gate;

wherein, at the time of passage of the one of the fingers and the hand through the focus space, the sensor unit scans only one single sharp scan image of the one of the fingers and the hand;

wherein the device is formed in a cranked manner, the device having a vertical stand which is open at its upper side and in which in the direction pointing upwards a sensor unit with its optics is arranged, wherein in the vertical stand a control and computing module, one of a supply source and a supply adapter, and other electronics are also arranged, wherein a reflection unit having an inclined reflection surface and an entry window for entry of the scanned image of the hand to be scanned into the reflection unit and further into the sensor unit via the inclined reflection surface is arranged in the open upper side of the vertical stand, wherein an additional camera for scanning at least one of a depth and a discontinuous movement, and an auxiliary scanning camera for detecting the liveness are arranged in the reflection unit, wherein a control and guidance display is further arranged on the reflection unit.

2. The device according to claim 1, wherein the light source is also coupled with the control and computing module.

3. The device according to claim 1, wherein the optical gate has at least one of an IR, a near IR, a visible laser and a LED radiation source which is directed transverse to the scanning direction of the sensor unit onto a photodiode which is arranged on an opposite side of the optical gate.

4. The device according to claim 1, wherein the optical gate has a proximity sensor.

5. The device according to claim 1, wherein the optical gate has a 3D camera which is adapted to detect the speed of the hand movement in the area to be scanned relative to the focus space and is adapted to determine the hand position in the area to be scanned relative to the focus space by a method of active triangulation.

6. The device according to claim 1, wherein the light source is a light source in the green part of the spectrum.

7. The device according to claim 1, wherein in addition to the light source at least one NIR radiation source with a wavelength of 760 to 840 nm is directed into in the focus space, capable of penetrating melanin and at the same time being absorbed by hemoglobin for detection of hand liveness during biometric identification.

8. The device according to claim 7, wherein an auxiliary scanning camera is directed into the focus space, the auxiliary camera being sensitive in at least one of the NIR or IR radiation range and adapted for scanning one of a scanned image and a scanned image sequence for detecting the liveliness of the hand in the focus space.

9. The device according to claim 1, wherein at least one light source of a visible radiation, at least one UV radiation source and at least one of an IR Radiation source and a near IR radiation source are directed into the focus space for simultaneous biometric identification using the at least one of fingerprints and hand characteristics and for determination of the liveliness of the hand.

10. The device according to claim 1, wherein at least one heat-sensitive sensor for detecting the liveness of the hand during the biometric identification is directed into the focus space.

11. The device according to claim 1, wherein the sensor unit has a maximized aperture number in relation to the illumination of the focus space and a diffraction limit, a target focus space begins in a position of the optical gate in relation to the sensor unit, which position is shifted in the scanning direction towards the sensor unit by a value, wherein the target focus space ends in a position of the optical gate in relation to the sensor unit, which position is shifted in the scanning direction towards the sensor unit by another value.

12. A method for biometric identification using at least one of fingerprints and hand characteristics using the device according to claim 1, wherein a sharp scan image of the hand is scanned with the sensor unit, the scan image being sent as scanned image data to the control and computing module, in which a scan image analysis is carried out, whereby hand contours are searched and the areas of occurrence of biometric data are detected, which are then analyzed and processed for the identification of at least one of the fingerprints and the hand characteristics and then compared with a database of at least one of existing fingerprints and existing hand characteristics, wherein only a single sharp scan image of the hand is scanned and processed for biometric identification using the at least one of the fingerprints and hand characteristics.

* * * * *